US007506249B2

(12) United States Patent
Kinno et al.

(10) Patent No.: US 7,506,249 B2
(45) Date of Patent: Mar. 17, 2009

(54) APPARATUS, METHOD AND PROGRAM FOR CONVERTING STRUCTURED DOCUMENT

(75) Inventors: Akira Kinno, Yokohama (JP); Minoru Etoh, Yokohama (JP); Yoshifumi Yonemoto, Yokohama (JP); Masashi Morioka, Yokohama (JP); Wataru Fujikawa, Yokohama (JP); Koichi Emura, Yokohama (JP)

(73) Assignees: NTT DoCoMo, Inc., Tokyo (JP); Panasonic Corporation, Kadoma-shi (JP)

( * ) Notice: Subject to any disclaimer, the term of this patent is extended or adjusted under 35 U.S.C. 154(b) by 56 days.

(21) Appl. No.: 10/743,825

(22) Filed: Dec. 24, 2003

(65) Prior Publication Data

US 2004/0181752 A1 Sep. 16, 2004

(30) Foreign Application Priority Data

Dec. 27, 2002 (JP) ............... P2002-379636

(51) Int. Cl.
*G06F 17/00* (2006.01)
(52) U.S. Cl. ............... 715/249; 715/239; 715/753
(58) Field of Classification Search ............ 715/523, 715/753, 249, 236, 239
See application file for complete search history.

(56) References Cited

U.S. PATENT DOCUMENTS

| | | | |
|---|---|---|---|
| 6,606,744 B1* | 8/2003 | Mikurak | 717/174 |
| 6,677,894 B2* | 1/2004 | Sheynblat et al. | 342/357.1 |
| 6,779,154 B1* | 8/2004 | Nussbaum et al. | 715/523 |
| 2002/0059345 A1 | 5/2002 | Wang et al. | |
| 2002/0157023 A1* | 10/2002 | Callahan et al. | 713/201 |
| 2003/0103528 A1* | 6/2003 | Kawaguchi et al. | 370/468 |
| 2003/0227487 A1* | 12/2003 | Hugh | 345/777 |
| 2004/0068506 A1* | 4/2004 | Kobayashi et al. | 707/100 |

FOREIGN PATENT DOCUMENTS

| | | |
|---|---|---|
| JP | 2001-160066 | 6/2001 |
| JP | P2002-007384 A | 1/2002 |

(Continued)

OTHER PUBLICATIONS

Huang, Anita W., et al, "A Semantic Transcoding to Adapt Web Services for Users with Disabilities", Proceedings of the Fourth International ACM Conference on Assistive Technologies, Nov. 2000, pp. 156-163.*

(Continued)

*Primary Examiner*—Laurie Ries
(74) *Attorney, Agent, or Firm*—Oblon, Spivak, McClelland, Maier & Neustadt, P.C.

(57) ABSTRACT

Acquisition portion acquires distribution rule information, user situation information, and a distribution information structured document output from contents distribution server, and evaluation object extraction portion extracts evaluation objects related with the user side situation from evaluation objects of each condition description portion contained in the distribution rule information, and user situation extraction portion extracts the situation of user terminal corresponding to evaluation objects concerned from the user situation information, and condition evaluation portion evaluates each condition description portion on the basis of the situation of the user terminal, and conversion rule information generation portion generates a conversion rule information on the basis of the result of the evaluation, and conversion portion converts a distribution information structured document on the basis of the conversion rule information, and output portion outputs the distribution information structured document to the contents distribution server.

33 Claims, 13 Drawing Sheets

FOREIGN PATENT DOCUMENTS

| JP | P2002-157223 A | 5/2002 |
|---|---|---|
| JP | 2004-213172 | 7/2004 |
| WO | WO 01/86462 A1 | 11/2001 |

OTHER PUBLICATIONS

Freire, Juliana, et al, "WebViews: Accessing Personalized Web Content and Services", Proceedings of the 10th International Conference on Word Wide Web, Apr. 2001, pp. 576-586.*

Ernesto Damiani, et al., "Design and Implementation of an Access Control Processor for XML Documents", Keywords: Security, Access Control Model, XML, http://www.acme.com/sec.xml, 16 pages.

François Bry, et al., "Adaptive Hypermedia Made Simple Using HTML/XML Style Sheet Selectors", Institute for Computer Science, University of Munich, http://www.pms.informatik.uni-muenchen.de/, 4 pages.

Michael Floyd, "Turn XML Into HTML", PCMAG.COM, 'Online!, XP-002324499, Jun. 12, 2001, pp. 1-6.

Akira Kinno, et al., "Environment Adaptive XML. Transformation and Its Application to Content Delivery", Proceedings of the 2003 Symposium on Applications and the Internet, XP-010628985, Jan. 27, 2003, pp. 31-38.

* cited by examiner

Fig.4

```
<Mpeg7 xmlns="urn:mpeg:mpeg7:schema:2001" xmlns:mpeg7="urn:mpeg:mpeg7:schema:2001"
xmlns:xsi="http://www.ww.org/2001/XMLSchema-instance" >
<Description xsi:type="ContentEntityType">
<MultimediaContent xsi:type="AudioVisualType">
<AudioVisual>
  <MediaInformation>
    <MediaProfile>
      <MediaInstance>
        <InstanceIdentifier type="URI" organization="aa" encoding="text" >
          Succer01
        </InstanceIdentifier>
        <MediaLocator><MediaUri>rstp://a.tv/sc.mp4</MediaUri></MediaLocator>
      </MediaInstance>
    </MediaProfile>
  </MediaInformation>                                                               } 41
  <MediaTime>
    <MediaRelTimePoint>PT0S</MediaRelTimePoint>
    <MediaIncrDuration mediaTimeUnit="PT1N30F">27000</MediaIncrDuration>
  </MediaTime>                                                                      } 42
  <TemporalDecomposition criteria="scene" overlap="false" gap="false" >
    <AudioVisualSegment id="sc01">
      <PointOfView viewpoint="Violence">
        <Importance>
          <Value>0.0</Value>
        </Importance>                                                               } 43a
      </PointOfView>
      <MediaTime>
        <MediaRelTimePoint>PT0S</MediaRelTimePoint>
        <MediaIncrDuration mediaTimeUnit="PT1N30F">300</MediaIncrDuration>
      </MediaTime>                                                                  } 43b
    </AudioVisualSegment>                                                                    } 43
    <AudioVisualSegment id="sc02">
      <PointOfView viewpoint="Violence">
        <Importance>
          <Value>0.8</Value>
        </Importance>                                                               } 44a
      </PointOfView>
      <MediaTime>
        <MediaRelTimePoint>PT10S</MediaRelTimePoint>
        <MediaIncrDuration mediaTimeUnit="PT1N30F">300</MediaIncrDuration>
      </MediaTime>                                                                  } 44b
    </AudioVisualSegment>                                                                    } 44
    ...
  </TemporalDecomposition>
</AudioVisual>
</MultimediaContent>
</Description>
</Mpeg7>
```

Fig.5

```
<?xml version="1.0" encoding="UTF-8"?>
<policyStatement policyId="//xx.com/p01" ruleCombiningAlgId="//www.oo.org/committees/xacml/docs
 /ruleCombiningAlgorithms/denyOverrides" xmlns="…" xmlns:saml="…" xmlns:xsi="…">
 <target>
  <subjects>
   <saml:Attribute AttributeName="RFC822Name" AttributeNamespace="…">     ⎫
    <saml:AttributeValue>*</saml:AttributeValue>                          ⎬ 51a
   </saml:Attribute>                                                      ⎭
  </subjects>
  <resources>
   <saml:Attribute AttributeName="documentURI" AttributeNamespace="…">    ⎫
    <saml:AttributeValue>//xx.com/c01.xml</saml:AttributeValue>           ⎬ 51b
   </saml:Attribute>                                                      ⎭
  </resources>
  <actions><saml:Action>read</saml:Action></actions>                      } 51c
 </target>
 <ruleSet>
  <rule ruleId="//xx.com/r0101" effect="Deny">
   <condition>
    <and>
     <equal>                                                              ⎫
      <saml:AttributeDesignator AttributeName="documentURI" AttributeNamespace="…"/>
      <saml:Attribute AttributeName="documentURI" AttributeNamespace="…">
       <saml:AttributeValue>//PointOfView[@viewpoint="violence"]</saml:AttributeValue>
      </saml:Attribute>                                                   ⎬ 52a
     </equal>
     <greaterOrEqual>
      <saml:AttributeDesignator AttributeName="value" AttributeNamespace="…"/>
      <saml:Attribute AttributeName="value" AttributeNamespace="…">
       <saml:AttributeValue>0.5</saml:AttributeValue></saml:Attribute>
     </greaterOrEqual>                                                    ⎭
     <not>
      <and>                                                               ⎫
       <equal>
        <saml:AttributeDesignator AttributeName="role" AttributeNamespace="…"/>
        <saml:Attribute AttributeName="role" AttributeNamespace="…">
         <saml:AttributeValue>vip</saml:AttributeValue></saml:Attribute>
       </equal>                                                           ⎬ 52b
       <greaterOrEqual>
        <saml:AttributeDesignator AttributeName="age" AttributeNamespace="…"/>
        <saml:Attribute AttributeName="age" AttributeNamespace="…">
         <saml:AttributeValue>18</saml:AttributeValue></saml:Attribute>
       </greaterOrEqual>
      </and>                                                              ⎭
     </not>
    </and>
   </condition>
  </rule>
  <rule ruleId="//xx.com/r0102" effect="Deny">…</rule>
  :
 </ruleSet>
</policyStatement>
```

51 — (subjects/resources/actions group: 51a, 51b, 51c)
52 — (rule conditions group: 52a, 52b)

Fig.6

```
<?xml version="1.0"?>
<rdf:RDF xmlns:rdf="http://www.ww.org/1999/02/22-rdf-syntax-ns"
 xmlns:ccpp="http://www.ww.org/2000/07/04-ccpp"
 xmlns:prf="http://www.ff.org/profiles/UAPROF/ccppschema-20010330"
 xmlns:pss5="http://www.pp.org/profiles/PSS/ccppschema-PSS5"
 xmlns:up="http://www.aa.co.jp/profiles/UP/ccppschema-UP"
 xmlns:upf="http://www.aa.co.jp/profiles/UPF/ccppschema-UPF">
<rdf:Description rdf:about="http://www.bb.com/Phones/Phone007">
 <ccpp:component>
  <rdf:Description ID="UserProfile">
   <rdf:type rdf:resource="http://www.aa.co.jp/Profiles/UP/
        ccppschema-UP#UserProfile"/>
   <up:role>guest</up:role>
   <up:age>16</up:age>
  </rdf:Description>
 </ccpp:component>
</rdf:Description>
</rdf:RDF>
```

```
<?xml version="1.0"?>
<xsl:stylesheet version="1.0" xmlns:xsl="http://www.ww.org/1999/XSL/Transform"
  xmlns:mpeg7="urn:mpeg:mpeg7:schema:2001">
<xsl:template match="*|@*">
 <xsl:copy>
  <xsl:apply-templates select="@*|*|text()"/>
 </xsl:copy>
</xsl:template>
<xsl:template match="mpeg7:AudioVisualSegment">
 <xsl:choose>
  <xsl:when test="mpeg7:PointOfView[@viewpoint='Violence']/mpeg7:Importance/mpeg7:Value>0.5"/>
  <xsl:otherwise>
   <xsl:copy>
    <xsl:apply-templates select="@*|*|text()"/>
   </xsl:copy>
  </xsl:otherwise>
 </xsl:choose>
</xsl:template>
</xsl:stylesheet>
```

```
<TemporalDecomposition criteria="scene" overlap="false" gap="false">
    <AudioVisualSegment id="sc01">
        <PointOfView viewpoint="Violence">
            <Importance>
                <Value>0.0</Value>
            </Importance>
        </PointOfView>
        <MediaTime>
            <MediaRelTimePoint>PT0S</MediaRelTimePoint>
            <MediaIncrDuration mediaTimeUnit="PT1N30F">300</MediaIncrDuration>
        </MediaTime>
    </AudioVisualSegment>
     :
</TemporalDecomposition>
```

43

APPARATUS, METHOD AND PROGRAM FOR CONVERTING STRUCTURED DOCUMENT

BACKGROUND OF THE INVENTION

1. Field of the Invention

The present invention relates to an apparatus, a method and a program for converting structured document such as the XHTML document.

2. Related Background Art

Along with the high speed processing in recent networks and terminals, the distribution technologies of multimedia contents (images, sounds, etc.) to be realized in wide area networks such as Internet or so have attracted considerable attention. As one of the technologies, there is UMA (Universal Multimedia Access). The UMA is the technology that customizes and distributes multimedia contents according to the environmental situations of users. The environmental situations of users include the capability of terminals that users use, the capability of the networks to which the terminals are connected, users' locations, time zone, and so forth. Moreover, as another technology, there is a technology called AAA (Authentication Authorization Accounting). The AAA is the technology that customizes and distributes various kinds of services to be offered in wide area networks according to users' status situations. The users' status situations include, for example, users' ages, affiliations, licenses, and the like.

The technologies for customizing and distributing the multimedia contents, network services, and so forth according to various kinds of situations of users have been disclosed in, for example, the paper 1 "Design and Implementation of an Access Control Processor for XML Documents" by E.Damiani, S.Vimercati, S.Paradoshi, P.Samarati, in Proceedings of the 9th International WWW Conference, May 2000, or the paper 2 "Adaptive Hypermedia made simple using HTML/XML Style Sheet Selectors". by F.Bry, M.Kraus, in Proceedings of the 2th International Conference on Adaptive Hypermedia and Adaptive Web Based Systems (AH 2002), and so forth.

The paper 1 discloses a technology wherein on the basis of user information (user's status situations) such as user ID, password, IP address, user authority, and the like, an XHTML document described by XHTML (eXtensible HyperText-MarkupLanguage) that is a language for describing structured documents is converted into an XHTML document according to each user's authority, and distributed to users, thereby access control of users is performed.

And, the paper 2 discloses a technology wherein an XHTML document that is a structured document is converted into an XHTML document that is fitted to each environmental situation on the basis of environmental situations at the side of each user. In the technology disclosed in the paper 2, XHTML documents are converted by use of existing style sheets such as CSS (Cascading Style Sheet) and XSLT (XML Stylesheet Language Transform) and so on.

SUMMARY OF THE INVENTION

However, in the paper 1, the framework that converts the XHTML document that is a structured document has not been disclosed. Moreover, in the technology disclosed in the paper 2, for using the existing style sheets, the conversion rules assembled in each style sheet had to be changed, which has led to difficulties.

The object of the present invention is to solve the problems of the prior art, accordingly, to provide an apparatus, a method and a program for converting structured document.

A structured document conversion device according to the present invention is characterized in comprising acquisition means for acquiring the distribution rule information wherein the distribution rules of contents are described and the receiver side situation information wherein the situations at the side of receivers of the contents are described, and generation means for generating the conversion rule information wherein the conversion rules for converting structured documents in which information about contents is described, on the basis of the distribution rule information and the receiver side situation information acquired by the acquisition means, and conversion means for converting structured documents, on the basis of the conversion rule information generated by the generation means.

Moreover, a structured document conversion method according to the present invention is characterized in comprising acquisition step of acquiring the distribution rule information wherein the distribution rules of contents are described and the receiver side situation information wherein the situations at the side of receivers of the contents are described, and generating step of generating the conversion rule information wherein the conversion rules for converting the structured documents in which information about contents is described, on the basis of the distribution rule information and the receiver side situation information acquired in the acquisition step, and conversing step of converting structured documents, on the basis of the conversion rule information generated in the generating Furthermore, a structured document conversion program according to the present invention is characterized in functioning a computer as acquisition means for acquiring the distribution rule information wherein the distribution rules of contents are described and the receiver side situation information wherein the situations at the side of receivers of the contents are described, and generation means for generating the conversion rule information wherein the conversion rules for converting the structured document in which information about contents is described, on the basis of the distribution rule information and the receiver side situation information acquired by the acquisition means, and conversion means for converting structured documents, on the basis of the conversion rule information generated by the generation means.

According to the present invention, the conversion rule information is generated on the basis of the distribution rule information and the receiver side situation information, and further structured documents are converted on the basis of this conversion rule information, consequently, structured documents can be converted according to the situations at the side of receivers.

In a structured document conversion device according to the present invention, it is preferred that the generation means comprises a first extraction means for extracting evaluation objects of the conditions included in the distribution rules from the distribution rule information, a second extraction means for extracting the receiver side situation corresponding to the evaluation object from the receiver side situation information on the basis of the evaluation object extracted by the first extraction means, and evaluation means for evaluating conditions on the basis of the receiver side situation extracted by the second extraction means, and on the basis of the results of the evaluation performed by the evaluation means, conversion rule information is generated.

Moreover, in a structured document conversion method according to the present invention, it is preferred that the generating step comprises a first extracting step for extracting evaluation objects of the conditions included in the distribution rules from the distribution rule information, a second extracting step for extracting the receiver side situation corresponding to the evaluation object from the receiver side situation information on the basis of the evaluation object extracted in the first extracting step, and evaluating step for evaluating conditions on the basis of the receiver side situation extracted by the second extracting step, and thereby generates the conversion rule information on the basis of the results of the evaluation performed in the evaluating step.

Furthermore, in a structured document conversion program according to the present invention, it is preferred that the generation means comprises a first extraction means for extracting evaluation objects of the conditions included in the distribution rules from the distribution rule information, a second extraction means for extracting the receiver side situation corresponding to the evaluation object from the receiver side situation information on the basis of the evaluation objects extracted by the first extraction means, and evaluation means for evaluating conditions on the basis of the receiver side situation extracted by the second extraction means, and on the basis of the results of the evaluation performed by the evaluation means, and thereby generates the conversion rule information.

According to the preferred manners, the conditions included in the distribution rules can be evaluated on the basis of the receiver side situation, therefore, for example, by describing the information about a user in the receiver side situation, and by describing the distribution rule information according to the receiver side situation to the distribution rule information, distribution control to structured documents can be performed according to the receiver side situation.

In a structured document conversion device according to the present invention, it is preferred that, when the evaluation performed by the evaluation means is a negative evaluation, the generation means generates conversion rule information including a conversion rule to delete objects corresponding to the conditions under which the evaluation has been performed from the structured document or change the objects concerned.

Moreover, in a structured document conversion method according to the present invention, it is preferred that, when the evaluation performed in the evaluating step is a negative evaluation, the generating step generates conversion rule information including a conversion rule to delete objects corresponding to the conditions under which the evaluation has been performed from the structured document or change the objects concerned.

Furthermore, in a structured document conversion program according to the present invention, it is preferred that, when the evaluation performed by the evaluation means is a negative evaluation, the generation means generates conversion rule information including a conversion rule to delete objects corresponding to the conditions under which the evaluation has been performed from the structured document or change the objects concerned.

According to the preferred manners, when an evaluation of the conditions included in the distribution rule performed on the basis of the receiver side situation is a negative evaluation, objects corresponding to the conditions under which the evaluation has been performed can be deleted from the structured document or the objects concerned can be changed, consequently, it is possible to convert structured documents according to the receiver side situation.

Further, it is preferred that a structured document conversion device according to the present invention further comprises memory means for storing the conversion rule information generated by the generation means, in correspondence to the evaluation objects extracted by the first extraction means and the receiver side situation extracted by the second extraction means, wherein the generation means further comprises a third extraction means that, on the basis of the evaluation objects extracted by the first extraction means and the receiver side situation extracted by the second extraction means, extracts the conversion rule information corresponding to the evaluation objects and the receiver side situation from the conversion rule information stored by the memory means, and when conversion rule information is not extracted by the third extraction means, the generation means generates conversion rule information on the basis of the result of the evaluation performed by the evaluation means, and when conversion rule information is extracted by the third extraction means, the conversion means converts a structured document, on the basis of the extracted conversion rule information.

Moreover, it is preferred that a structured document conversion method according to the present invention further comprises a storing step for storing the conversion rule information generated in the generating step, in correspondence to the evaluation objects extracted in the first extracting step and the receiver side situation extracted in the second extracting step, wherein the generating step further comprises a third extracting step that, on the basis of the evaluation objects extracted in the first extracting step and the receiver side situation extracted in the second extracting step, extracts the conversion rule information corresponding to the evaluation objects and the receiver side situation from the conversion, rule information stored in the storing step, and when conversion rule information is not extracted in the third extracting step, the generating step generates conversion rule information on the basis of the result of the evaluation performed in the evaluating step, and when conversion rule information is extracted in the third extracting step, the conversing step converts a structured document, on the basis of the extracted conversion rule information.

Furthermore, it is preferred that a structured document conversion program according to the present invention further comprises memory means for storing the conversion rule information generated by the generation means, in correspondence to the evaluation objects extracted by the first extraction means and the receiver side situation extracted by the second extraction means, wherein the generation means further comprises a third extraction means that, on the basis of the evaluation objects extracted by the first extraction means and the receiver side situation extracted by the second extraction means, extracts the conversion rule information corresponding to the evaluation objects and the receiver side situation from the conversion rule information stored by the memory means, and when conversion rule information is not extracted by the third extraction means, the generation means generates conversion rule information on the basis of the result of the evaluation performed by the evaluation means, and when conversion rule information is extracted by the third extraction means, the conversion means converts a structured document, on the basis of the extracted conversion rule information.

According to the further preferred manners, because the existing conversion rule information can be acquired and reused, it becomes possible to convert structured documents at further higher speed.

BRIEF DESCRIPTION OF THE DRAWINGS

FIG. 4 is a sample of a distribution information structured document.

FIG. 5 is a sample of a distribution rule information.

FIG. 6 is a sample of a user situation information.

FIG. 7 is a sample of a conversion rule information.

FIG. 8 is a sample of a portion of a distribution information structured document after conversion.

DESCRIPTION OF THE PREFERRED EMBODIMENTS

Respective preferred embodiments of the structured document conversion device according to the present invention are explained hereinafter in more details by reference to the attached drawings. In the respective drawings, an identical code is given to a same element, and redundant explanations are omitted hereinafter.

First Preferred Embodiment

Figure 1:
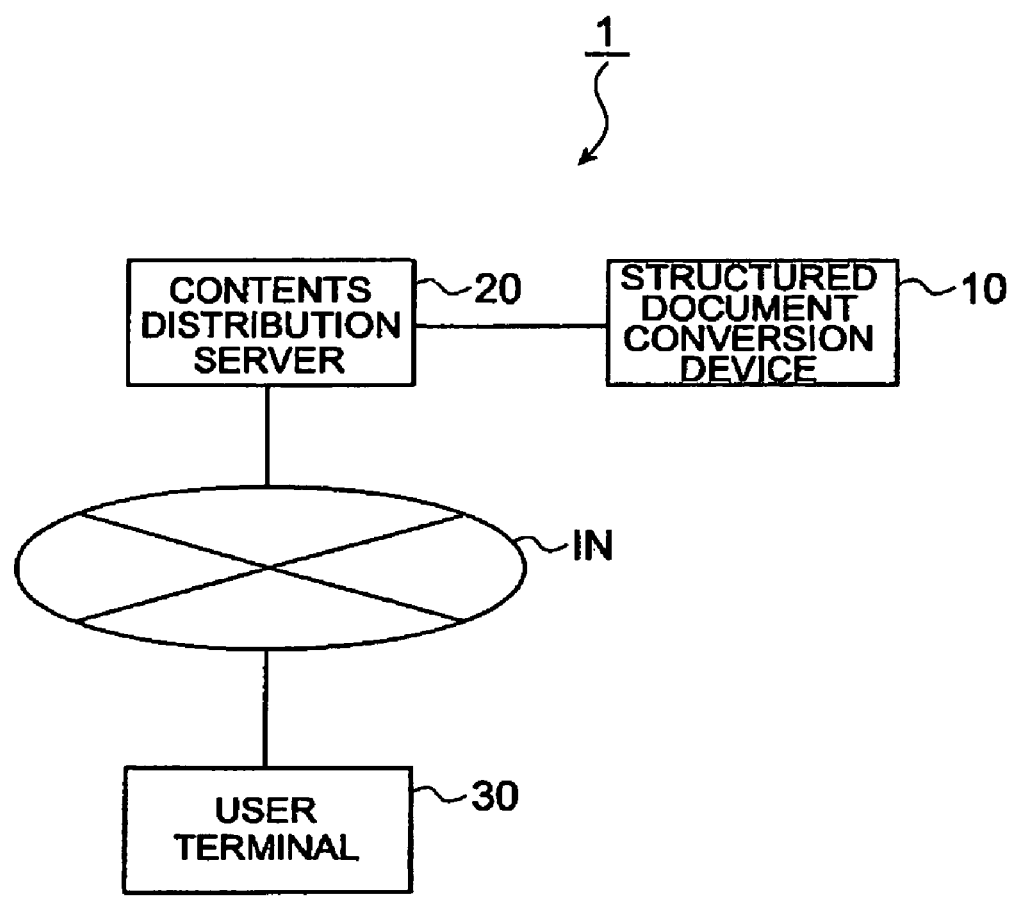
FIG. 1 is a schematic diagram showing a structure of a communication system in each preferred embodiments according to the present invention.

FIG. 1 is a schematic diagram showing the configuration of a communication system containing a structured document converter according to the first preferred embodiment of the present invention. As shown in FIG. 1, the communication system 1 comprises a structured document conversion device 10, a contents distribution server 20 that distributes multimedia contents, Internet IN, and a user terminal 30 connectable to the internet. In addition, as for the structured document conversion device 10, the contents distribution server 20, and the user terminal 30 shown in FIG. 1, although plural units thereof may be arranged in actual cases, in order to prevent the drawing becoming complicated, a structured document conversion device 10, a contents distribution server 20, and a user terminal 30 are only shown in FIG. 1.

In the next place, the structured document conversion device 10 shown in FIG. 1 is explained. The structured document conversion device 10 is connected to the contents distribution server 20. This structured document conversion device 10 is a device that converts a distribution information structured document that describes the information about the multimedia contents distributed by the contents distribution server 20 into a distribution information structured document according to the situation at the side of the user terminal 30.

Herein, as the languages for describing a structured document, there are, for example, XHTML, SGML (Standard Generalized Markup Language), HTML (Hyper Text Markup Language), XML (extensible Markup Language), and so forth. In the present preferred embodiment, although explanations are made by use of XML as the language for describing a structured document for convenience of explanation, this does not mean that a structured document is limited to an XML document.

In addition, the structured document conversion device 10 in the present preferred embodiment is described as a device that is independent of the contents distribution server 20, however, the present invention is not limited to this, but for example, the various functions of the structured document conversion device 10 may be equipped in the contents distribution server 20 as described later herein.

Figure 2:
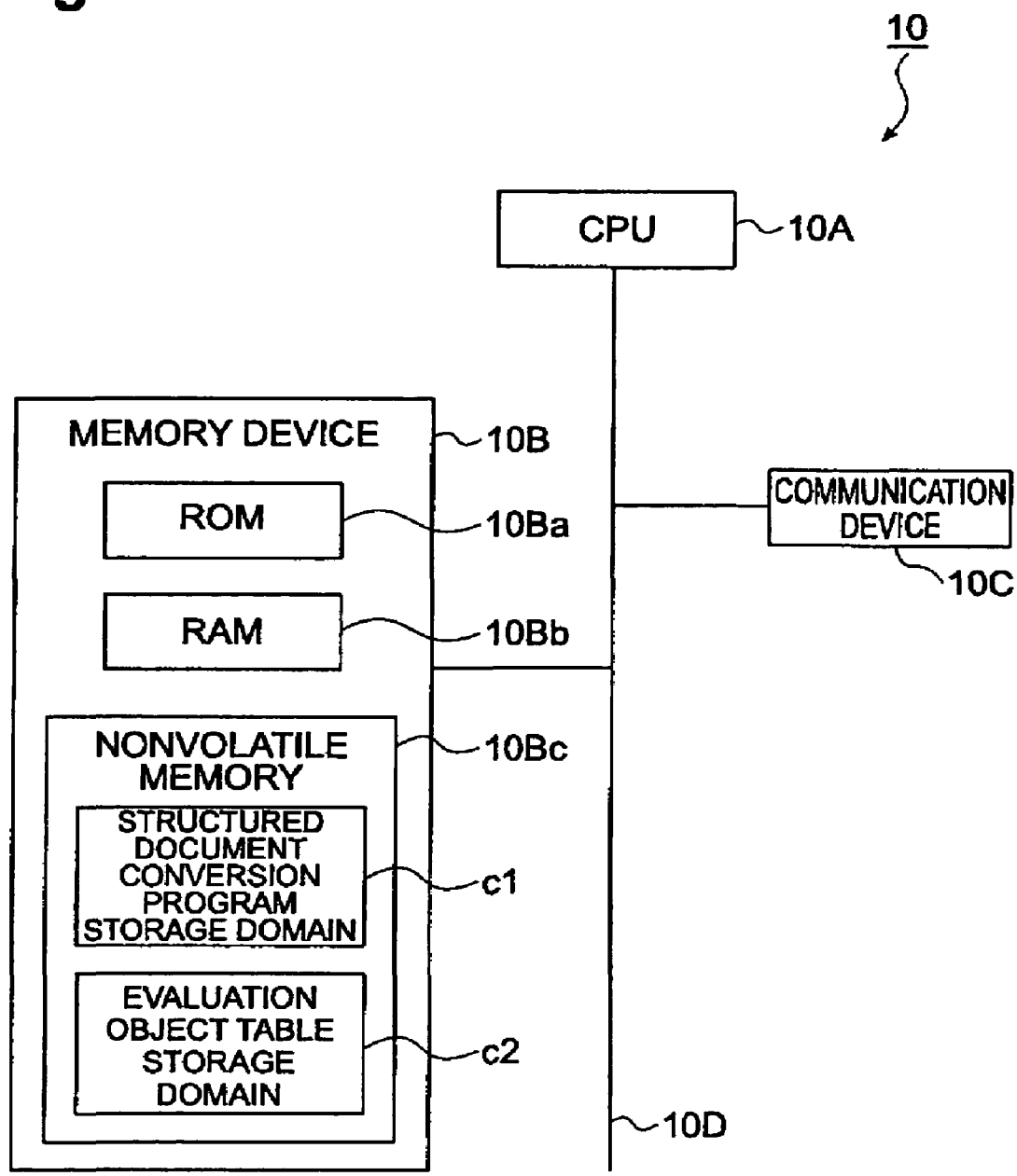
FIG. 2 is a block diagram showing a hardware configuration of a structured document conversion device according to the first preferred embodiment.

In the next place, by reference to FIG. 2, the hardware configuration of the structured document conversion device 10 is explained. As shown in FIG. 2, the structured document conversion device 10 has a CPU 10A, a memory device 10B, and a communication device 10C, and each of these devices is connected with a bus 10D.

The CPU 10A performs the various programs stored in the memory device 10B, and thereby controls each device connected through the bus 10D. The communication device 10C is a communication interface for connecting to networks, such as Internet IN and so on.

The memory device 10B includes a ROM (Read Only Memory) 10Ba, a RAM (Random Access Memory) 10Bb, and a nonvolatile memory 10Bc such as an EEPROM (Electrically Erasable Programmable Read Only Memory) or the like. Various programs to be performed by the CPU 10A are stored in the ROM 10Ba. The program and data that are performed by the CPU 10A are temporarily stored in the RAM 10Bb, which is used as a work area of the CPU 10A.

The nonvolatile memory 10Bc includes a structured document conversion program storage domain c1 and an evaluation object table storage domain c2. A program for realizing a structured document conversion process, as will be mentioned later herein, is stored in the structured document conversion program storage domain c1. An evaluation object table is stored in the evaluation object table storage domain c2. The evaluation object table stores the information that indicates whether the evaluation object is related to the user's situation in correspondence to each evaluation object, as will be mentioned later herein.

Figure 3:
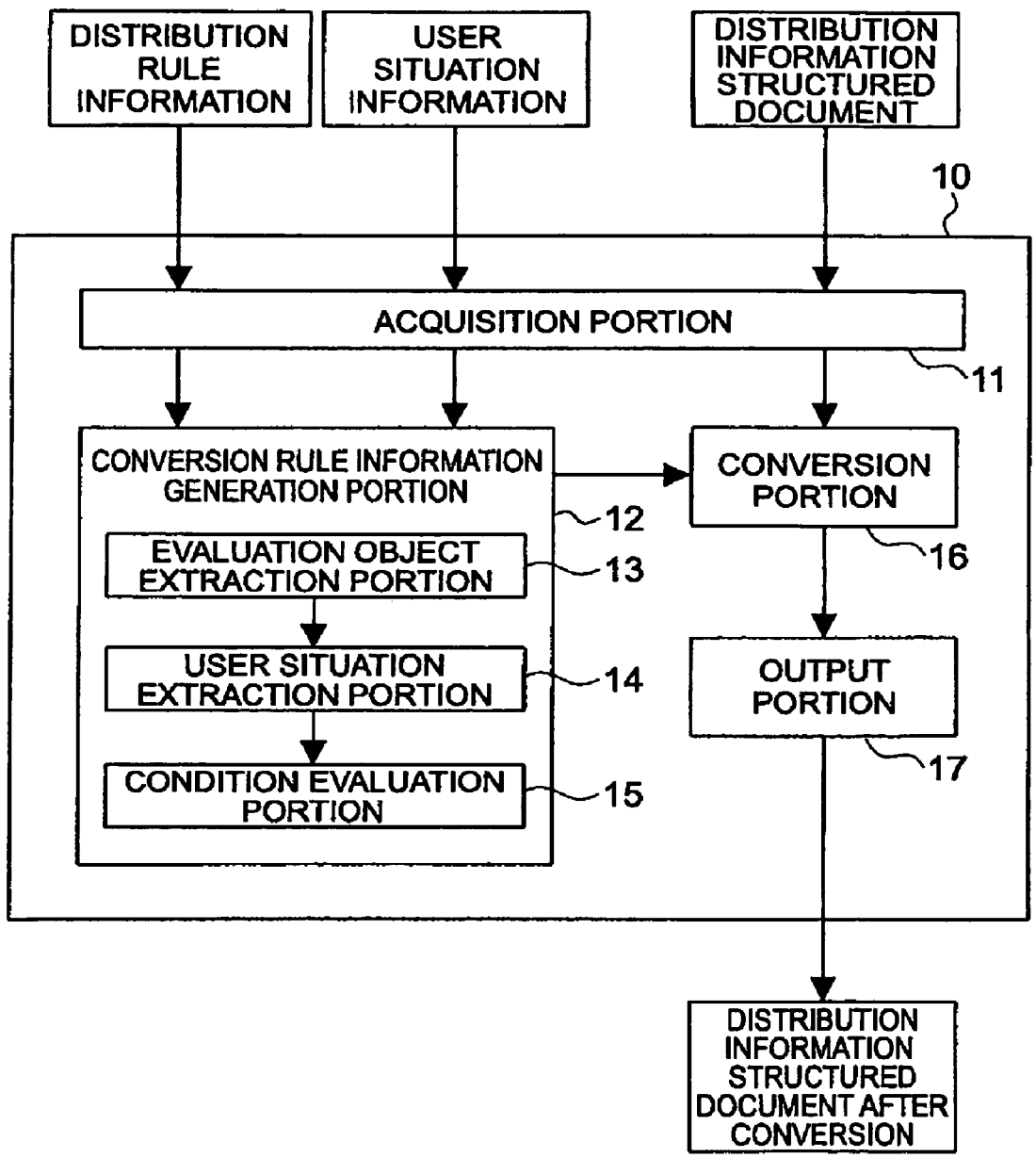
FIG. 3 is a functional configuration block diagram of a structured document conversion device in the first preferred embodiment.

In the next place, the functional configuration of the structured document conversion device 10 that constitutes the communication system 1 is explained by reference to FIG. 3. As shown in. FIG. 3, the structured document conversion device 10 is equipped with an acquisition portion 11, a conversion rule information generation portion 12, a conversion portion 16, and an output portion 17.

The acquisition portion 11 acquires distribution rule information, user situation information, and a distribution information structured document that are output from the contents distribution server 20. The distribution rule information is an XML document that describes the distribution rule at the moment of distributing the multimedia contents described in the distribution information structured document. The user situation information is an XML document that describes the situation of the user terminal 30 that receives the multimedia contents described in the distribution information structured document. The distribution information structured document, the distribution rule information, and the user situation information are explained in detail hereinafter.

In the first place, by reference to FIG. 4, the distribution information structured document wherein the information about multimedia contents is described is explained. The properties about multimedia contents are described in the MediaInformation description portion 41 shown in FIG. 4. As these properties, there are, for example, a URI (Uniform Resource Identifier) of multimedia contents, and a coding system of multimedia contents. Moreover, the start time and duration of multimedia contents is described in the MediaTime description portion 42.

In the AudioVisualSegment description portions 43 and 44, the properties about respective objects (for example, image scenes) "sc01" and "sc02" contained in multimedia contents are described. As these properties, there are, for example, the MediaTime description portions 43b and 44b wherein the start time and duration of an object is described, and PointOfView description portions 43a and 44a wherein the keywords that show the contents of an object and the likes are described. In the PointOfView description portion 43a shown in FIG. 4, "Violence" is described as a keyword (Viewpoint) showing the contents of an object "sc01", and "0.0" is described as the value (Value) of this object. These descriptions show that a degree of "Violence" contained in the object "sc01" is "0.0" (a degree to be shown by 0.0~1.0.). And, in the PointOfView description portion 44a, "Violence" is described as a keyword showing the contents of the object "sc02", and "0.8" is described as the value of this object. These descriptions show that a degree of "Violence" contained in an object "sc02" is "0.8".

In the next place, the distribution rule information is explained by reference to FIG. 5. As shown in FIG. 5, the distribution rule information is constituted by the target description portion 51 and the rule Set description portion 52. In the target description portion 51, the subjects description portion 51a that describes the information for identifying an object user to whom this distribution rule is applied to, the resources description portion 51b that describes the information for identifying an object document set as the object of distribution, and the actions description portion 51c that describes the information for identifying an operation that the object user performs to the object document are described. In the subjects description portion 51a, the information about the object user is described, and a mark "*" that shows that all the users that logged in to the contents distribution server 20 are objects is described in FIG. 5. And, in the resources description portion 51b, the information about an object document is described, and in FIG. 5, "//xx.com/c01.xml" (URI) is described as an object document. Furthermore, in the actions description portion 51c, the operation that an object user performs to an object document is described, and in FIG. 5, "read" is described as the operation. These descriptions show that all the users that logged in to the contents distribution server 20 are set as objects, and it is judged whether each of these object users meets the conditions described in the rule Set description portion 52 or not, and only users that meet the conditions can "read" the "//xx.com/c01.xml".

In the rule Set description portion 52, the distribution rule to the object user specified in the target description portion 51 is described. In the rule Set description portion 52, the condition description portions 52a and 52b are described. In the condition description portion 52a shown in FIG. 5, "Violence" is described in the PointOfView description portion described in the distribution information structured document shown in FIG. 4, among the objects contained in multimedia contents, and also described is the condition of the purport that objects whose values showing the degree thereof are "0.5" or higher should be the objects. Moreover, in the condition description portion 52b, "vip" is described in a user's role described in the user situation information to be described later herein, among the users who logged in to the contents distribution server 20, and also described is the condition of the purport that users at age of "18" or older should be the objects.

Therefore, in the distribution rule information shown in FIG. 5, "Violence" is described in the PointOfview description portion of the distribution information structured document (//xx.com/c01.xml), and as for the objects whose values showing the degree thereof are "0.5" or higher, "vip" is described in the role of the users of the user situation information, and further described is the distribution rule that only users at age of "18" or older can "read".

In the next place, by reference to FIG. 6, the user situation information is explained hereinafter. As shown in FIG. 6, in the user situation information, one or plural component description portions 61 are described. In the component description portion 61, the User Profile description portion wherein the information about a user is described, and the Hardware Platform description portion wherein the information about the terminal capability of the user terminal 30 is described are described. In the User Profile description portion 61a shown in FIG. 6, "guest" is described as the user's role and "16" is described as the age. These descriptions show that the user of the user terminal 30 logs in to the contents distribution server 20 as a "guest", and the user's age is "16".

Moreover, the conversion rule information generation portion 12 generates the conversion rule information for converting the distribution information structured document acquired by the acquisition portion 11, on the basis of the distribution rule information and the user situation information acquired by the acquisition portion 11. Herein, the conversion rule information is an XML document wherein the rule for converting a distribution information structured document according to various situations of users is described.

Herein, by reference to FIG. 7, the conversion rule information is explained. The conversion rule information shown in FIG. 7 is constituted by the template description portions 71 and 72. In this template description portion 72, "Violence" is described in the PointOfView description portion of the distribution information structured document, and also described is the purport that the AudioVisualSegment description portion wherein "0.5" or higher is described as the value showing the degree thereof should be the object of the processing. In the template description portion 71, described is the purport that the AudioVisualSegment description portion that has been made into the object of the processing in the template description portion 72 is deleted from the distribution information structured document, and other portions of AudioVisualSegment description portion are copied.

Moreover, the conversion rule information generation portion 12 shown in FIG. 3 is equipped with an evaluation object extraction portion 13, a user situation extraction portion 14, and a condition evaluation portion 15.

The evaluation object extraction portion 13 extracts the evaluation objects that are related with the user situation from the evaluation objects of each condition description portion contained in the distribution rule information. Herein, as the evaluation objects of each condition description portion, there are, for example, the element name, a keyword, and a URI to be described in a tag. By reference to the distribution rule information shown in FIG. 5, explanations are made more concretely hereinafter, and the evaluation object extraction portion 13 extracts the evaluation objects that are related with a user situation from the "PointOfview description portion" and "value" described as evaluation objects in the condition description portion 52*a* of the distribution rule information. The "PointOfview description portion" and "value" that are the evaluation objects in this case are evaluation objects relevant to an object, and are not evaluation objects relevant to a user situation. Therefore, in this case, the evaluation object extraction portion 13 will not extract the evaluation objects. Moreover, the evaluation object extraction portion 13 extracts the evaluation objects that are related with a user situation from the "role" and "age" described in the condition description portion 52*b* of the distribution rule information as evaluation objects. The "role" and "age" that are the evaluation objects in this case are the objects for evaluation relevant to a user situation. Therefore, the evaluation object extraction portion 13 extracts the "role" and "age" as evaluation objects that are related with a user situation. Herein, to the nonvolatile memory 10Bc of the memory device 10B, an evaluation object table that stores the information on whether the evaluation objects are evaluation objects relevant to a user situation or not, in correspondence to respective evaluation objects. Therefore, the evaluation object extraction portion 13 can judge whether the evaluation objects concerned are evaluation objects relevant to a user situation or not, by referring to the evaluation object table concerned on the basis of each evaluation object.

The user situation extraction portion 14 extracts the situation of the user terminal 30 corresponding to the evaluation objects concerned from the user situation information on the basis of the evaluation objects extracted by the evaluation object extraction portion 13. Explanations are made more concretely by reference to the user situation information shown in FIG. 6, and the user situation extraction portion 14 refers to the user situation information on the basis of the "role" and "age" as the evaluation objects extracted by the evaluation object extraction portion 13, and as a result, the user situation extraction portion 14 extracts "guest" corresponding to "role" and "16" corresponding to "age" respectively as the situation at the side of the user terminal 30.

The condition evaluation portion 15 evaluates each condition description portion contained in the distribution rule information on the basis of the situation of the user terminal 30 extracted by the user situation extraction portion 14. Explanations are made more concretely by reference to the distribution rule information shown in FIG. 5, and the condition evaluation portion 15 evaluates the condition description portions 52*a* and 52*b* shown in FIG. 5 on the basis of each of the "guest" corresponding to "role" and the "16" corresponding to "age" extracted by the user situation extraction portion 14. Namely, the condition evaluation portion 15 evaluates the condition description portion 52*b* on the basis of the situations at the side of the user terminal 30 the "guest" and the "16" corresponding to the "role" and the "age" that are the evaluation objects of the condition description portion 52*b*. As shown in FIG. 5, about the user of the user terminal 30, the condition evaluation portion 15 makes a negative evaluation that the "Violence" is described in the PointOfView description portion of the distribution information structured document, and the user cannot "read" objects whose values showing the degree thereof are "0.5" or higher.

Moreover, the condition evaluation portion 15 stores the evaluation result in the RAM 10Bb temporarily, in correspondence to each condition description portion. More concretely, when an evaluation result is an affirmative evaluation (true), the condition evaluation portion 15 stores "Permit", in correspondence to the condition description portion, and an evaluation result is a negative evaluation (false), then the condition evaluation portion 15 stores "Deny", in correspondence to the condition description portion. Therefore, since the evaluation result of the condition description portion 52*b* shown in FIG. 5 serves as a negative evaluation, "Deny" is stored in the RAM 10Bb in correspondence to the condition description portion 52*b*. In addition, the condition evaluation portion 15 does not evaluate the condition description portion 52*a* from which the evaluation object has not been extracted by the user situation extraction portion 14.

The conversion rule information generation portion 12 generates conversion rule information on the basis of the result of the evaluation performed by the condition evaluation portion 15. Explanations are made more concretely on the basis of the distribution rule information shown in FIG. 5, and the condition description portion 52*a* and the condition description portion 52*b* that are described in this distribution rule information are connected to each other with a logical product. Moreover, as mentioned above, this condition description portion 52*b* is stored in correspondence to "Deny". Therefore, the conversion rule information generation portion 12 generates conversion rule information that what satisfies the condition description portion 52*a* are denied. That is, the conversion rule information (Refer to FIG. 7.) that objects wherein "Violence" is described in the PointOfView description portion described by the distribution information structured document, and the value showing the degree thereof is "0.5" or higher are denied is generated by the conversion rule information generation portion 12.

By the way, as conversion rules in the case of the denial, there are, for example, the case where an object corresponding to denial (conditions under which an negative evaluation was made) is to be deleted from a distribution information structured document, and the case where such an object is to be changed into other object.

The conversion portion 16 converts a distribution information structured document (Refer to FIG. 4.) on the basis of the conversion rule information (Refer to FIG. 7.) generated by the conversion rule information generation portion 12. Explanations are made more concretely, and the conversion portion 16 deletes the description portion of the AudioVisualSegment description portion 44 from the distribution information structured document shown in FIG. 4 on the basis of the conversion rule described by the conversion rule information shown in FIG. 7. Thereby, the portion described by the AudioVisualSegment description portion 43 and the AudioVisualSegment description portion 44 described by the distribution information structured document shown in FIG. 4 are converted into the portion described only in the AudioVisualSegment description portion 43 as shown in FIG. 8.

The output portion 17 outputs the distribution information structured document converted by the conversion portion 16 to the contents distribution server 20.

Accordingly, in the structured document conversion device 10 in the present preferred embodiment, a distribution information structured document can be converted according to the situation of the user terminal 30 used as the distribution destination of multimedia contents.

Figure 9:
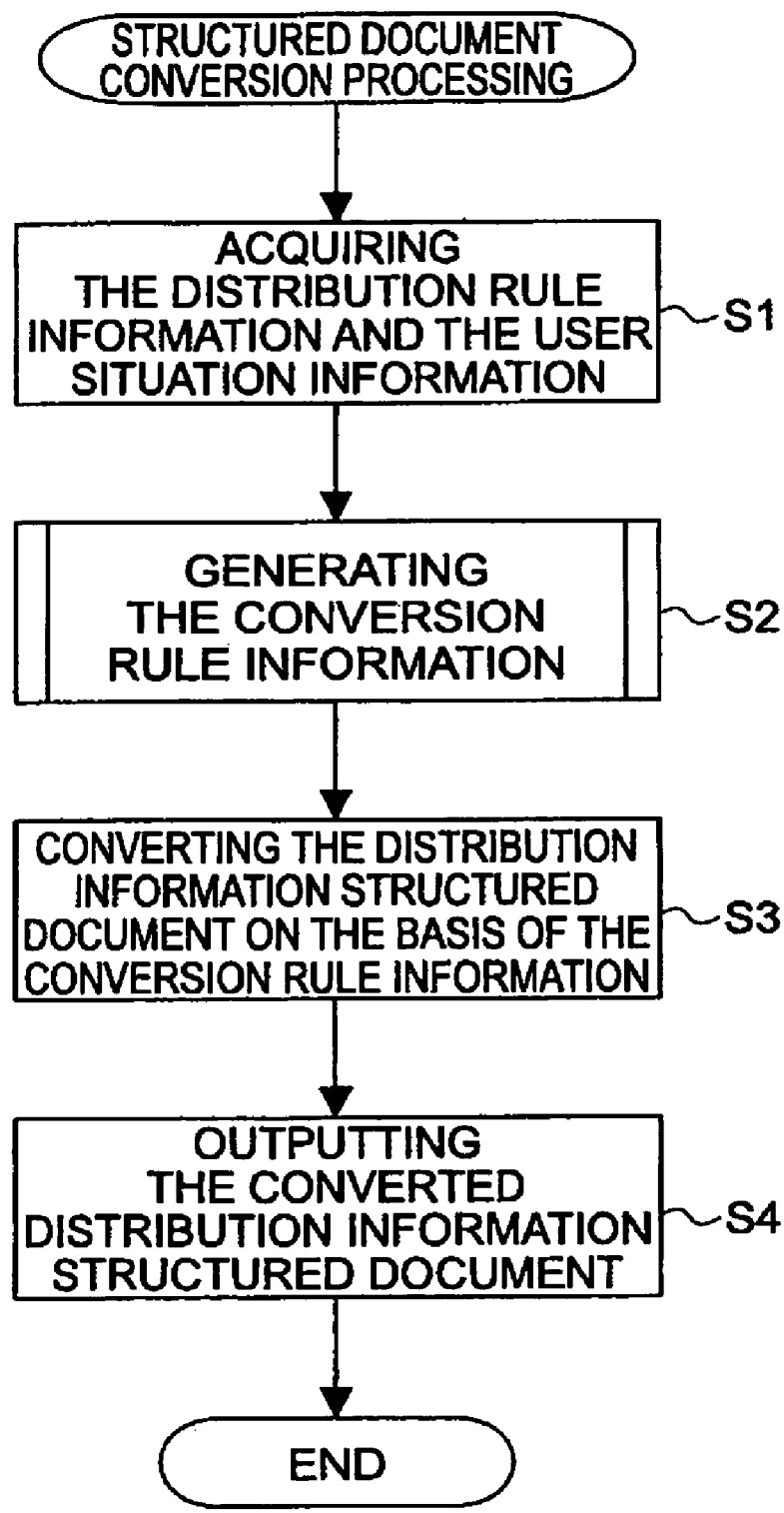
FIG. 9 is a flow chart showing a process of the structured document conversion device in each preferred embodiment.

In the next place, the operation of the structured document conversion device according to the present invention is explained by reference to FIG. 9 and FIG. 10.

First, the outline operation of the structured document conversion processing performed in the structured document conversion device 10 is explained by reference to FIG. 9.

In the first place, the acquisition portion 11 of the structured document conversion device 10 acquires the distribution rule information, user situation information, and distribution information structured document output from the contents distribution server 20 (Step S1).

In the next place, the conversion rule information generation portion 12 of structured document conversion device 10 performs a conversion rule information generation processing to be mentioned later herein on the basis of the distribution rule information and the user situation information acquired by the acquisition portion 11, and thereby generates conversion rule information (Step S2).

In the next place, the conversion portion 16 of structured document conversion device 10 acquires the conversion rule information generated by the conversion rule information generation portion 12, and converts the distribution information structured document on the basis of the conversion rule information (Step S3).

And, the output portion 17 of structured document conversion device 10 outputs the distribution information structured document converted by the conversion portion 16 to the contents distribution server 20 (Step S4).

Figure 10:
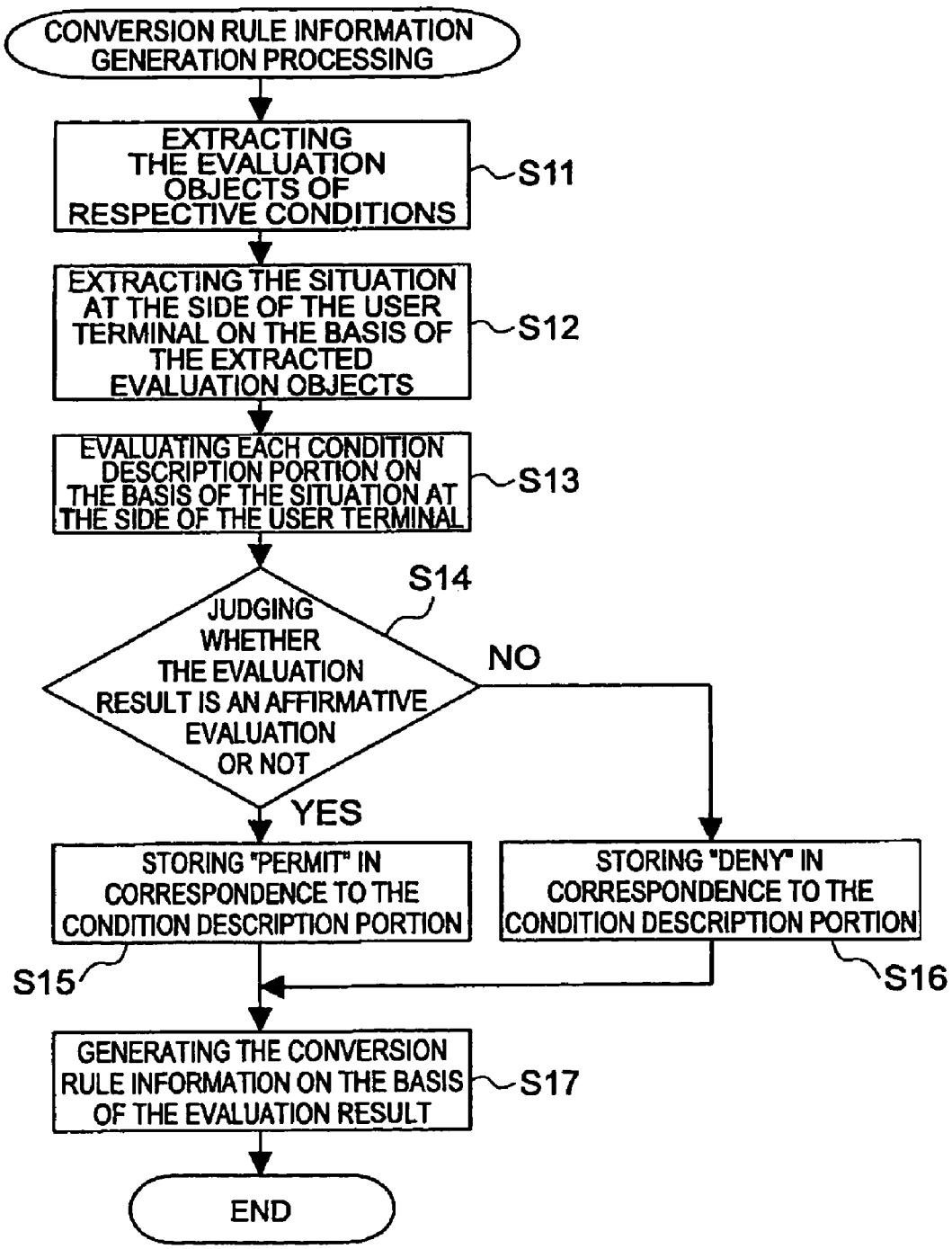
FIG. 10 is a flow chart showing a process of the conversion rule information generation in the first preferred embodiment.

In the next place, by reference to FIG. 10, the detailed operation of the conversion rule information generation processing (S2 in FIG. 9) is explained. The evaluation object extraction portion 13 of the structured document conversion device 10 extracts the evaluation objects that are related to a user situation, among the evaluation objects of each condition description portion contained in the distribution rule information acquired by the acquisition portion 11 from that distribution rule information (Step S11).

The user situation extraction portion 14 of the structured document conversion device 10 extracts the situation at the side of the user terminal 30 corresponding to that evaluation object from the user situation information, on the basis of the evaluation objects extracted by the evaluation object extraction portion 13 (Step S12).

The condition evaluation portion 15 of the structured document conversion device 10 evaluates each condition description portion on the basis of the situation of the user terminal 30 extracted by the user situation extraction portion 14 (Step S13), and judges whether the evaluation result is an affirmative evaluation or not (Step S14). When this judgment is YES (Step S14; YES), the condition evaluation portion 15 stores "Permit" on the RAM 10Bb, in correspondence to the condition description portion (Step S15). On the other hand, when it judges that the result of the evaluation of the condition description portion by the judgment in Step S14 is a negative evaluation (Step S14; NO), the condition evaluation portion 15 stores "Deny" on the RAMH 10Bb, in correspondence to the condition description portion (Step S16).

The conversion rule information generation portion 12 of the structured document conversion device 10 generates conversion rule information on the basis of the result of the evaluation performed by the condition evaluation portion 15 (Step S17). Explanations are made more concretely on the basis of the distribution rule information shown in FIG. 5, and the conversion rule information generation portion 12 generates conversion rule information that what satisfies the condition description portion 52a is to be denied, on the basis of the fact the condition description portion 52a and the condition description portion 52b are connected with a logical product, and that this condition description portion 52b is "Deny". That is, the conversion rule information generation portion 12 generates a conversion rule information (Refer to FIG. 7.) that objects wherein "Violence" is described in the PointOfview description portion described by the distribution information structured document, and the value showing the degree thereof is "0.5" or higher are to be deleted.

Accordingly, by describing a user's age and so forth to the user situation information, and by describing the information about the right to access according to the user's age and so forth to the distribution rule information, it becomes possible to perform the access control to a distribution information structured document according to user situation information.

Second Preferred Embodiment

In the next place, the second preferred embodiment according to the present invention is explained hereinafter. The point where the structured document conversion device 10s in the second preferred embodiment differs from the structured document conversion device 10 in the first preferred embodiment is that in the structured document conversion device 10s in the second preferred embodiment, when the generated conversion rule information is stored into the memory device and a distribution information structured document is converted in the next time and after that, this stored conversion rule information is reused, on the other hand, in the structured document conversion device 10 in the first preferred embodiment, whenever a distribution information structured document is converted, conversion rule information is generated, thus, the structured document conversion device 10s differs from the structured document conversion device 10.

Figure 11:
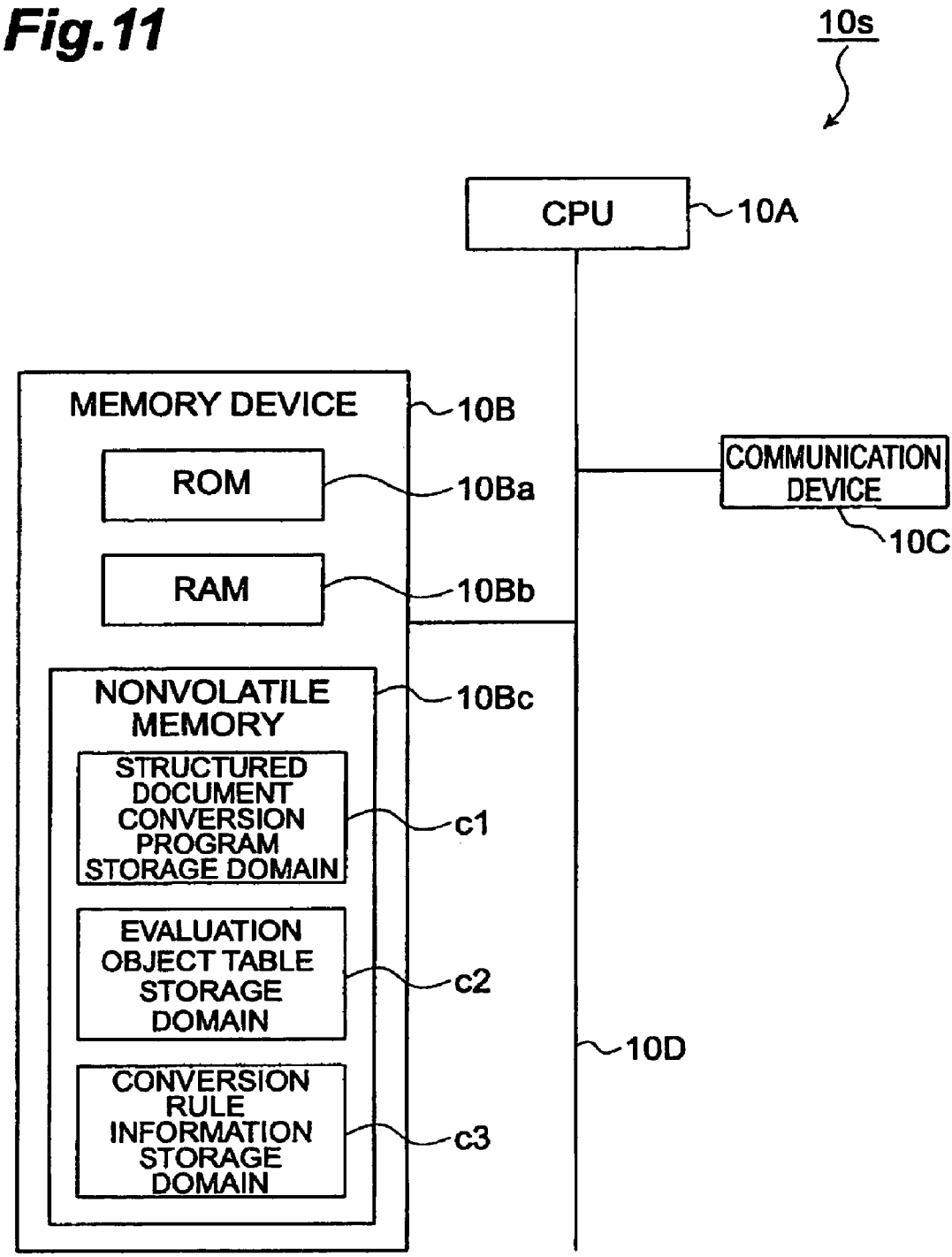
FIG. 11 is a block diagram showing a hardware configuration of the structured document conversion device in the second preferred embodiment.

In the first place, by reference to FIG. 11, the hardware configuration of the structured document conversion device 10s in the present preferred embodiment is explained. As shown in FIG. 11, the structured document conversion device 10s in the present preferred embodiment differs from the hardware configuration of the structured document conversion device 10 in the first preferred embodiment in that it has further a conversion rule information storage domain c3 in the nonvolatile memory 10Bc of the memory device 10B. Therefore, since the other configuration elements are same as the hardware configuration elements of the structured document conversion device 10 in the first preferred embodiment, redundant explanations are omitted with giving the each same mark to the each same element, and the conversion rule information storage domain c3 that is the difference from the first preferred embodiment is explained hereinafter.

Into the conversion rule information storage domain c3 of the nonvolatile memory 10Bc, conversion rule information generated by the conversion rule information generation portion is stored. This conversion rule information is stored in correspondence to the evaluation objects extracted by the evaluation object extraction portion and the situation of the user terminal 30 extracted by the user situation extraction portion.

Figure 12:
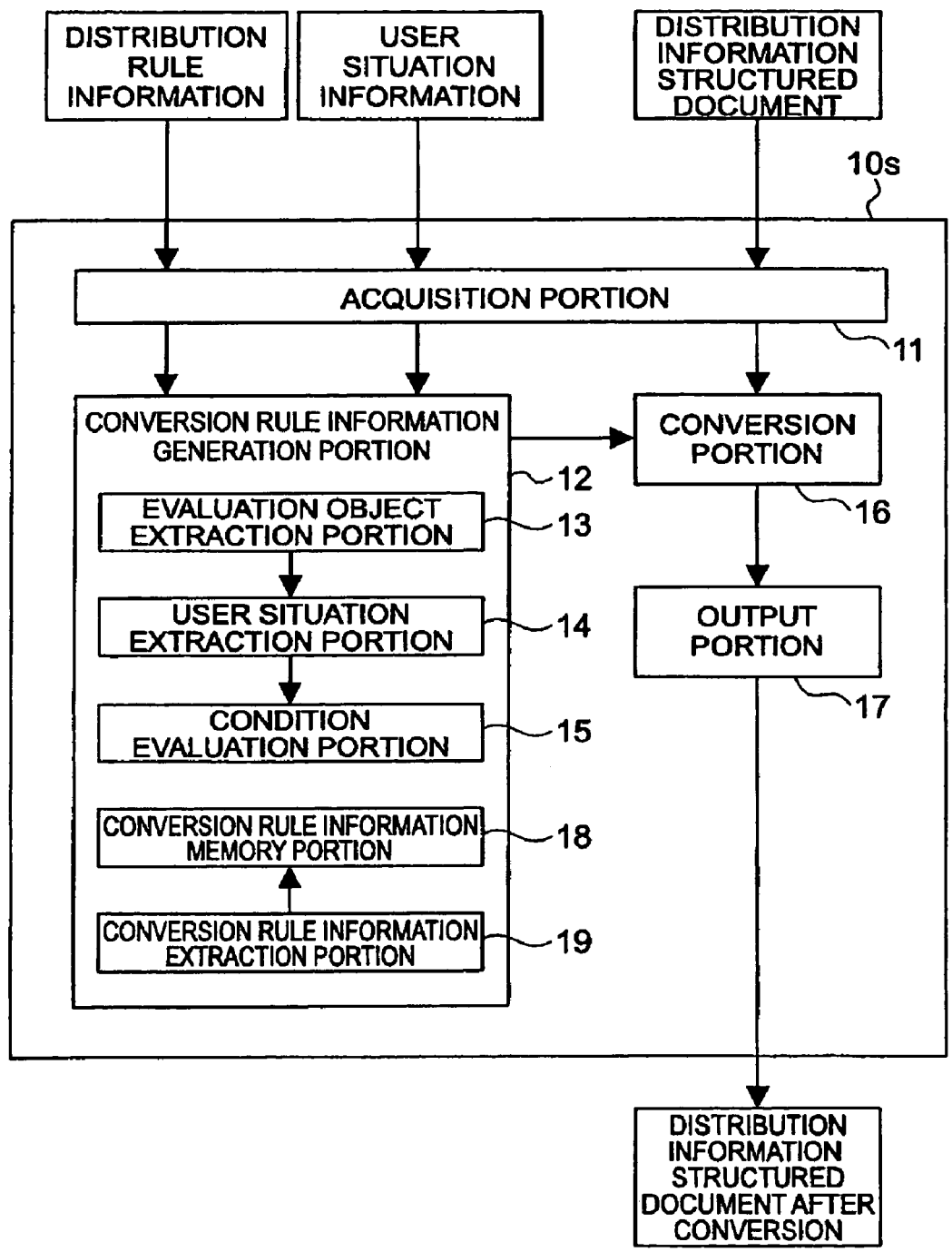
FIG. 12 is a block diagram showing the functional configuration of the structured document conversion device in the second preferred embodiment.

In the next place, by reference to FIG. 12, the functional configuration of the structured document conversion device 10s in the present preferred embodiment is explained. As shown in FIG. 12, the structured document conversion device 10s in the present preferred embodiment differs from the functional configuration of the structured document conversion device 10 in the first preferred embodiment in that it has further a conversion rule information memory portion 18 and a conversion rule information extraction portion 19. Therefore, since the other configuration elements are same as the functional configuration elements of the structured document conversion device 10 in the first preferred embodiment, redundant explanations are omitted with giving the each same mark to the each same element, and the conversion rule information memory portion 18 and the conversion rule information extraction portion. 19 that are the differences from the first preferred embodiment are explained hereinafter.

The conversion rule information memory portion 18 stores the conversion rule information generated by the conversion rule information generation portion 12 into the conversion rule information storage domain c3. When the conversion rule information memory portion 18 stores the conversion rule information, stores it concerned in correspondence to the evaluation objects extracted by the evaluation object extraction portion 13 and the situation of the user terminal 30 extracted by the user situation extraction portion 14.

The conversion rule information extraction portion 19 searches the conversion rule information stored to the conversion rule information storage domain c3 on the basis of the evaluation objects extracted by the evaluation object extraction portion 13 and the situation at the side of the user terminal 30 extracted by the user situation extraction portion 14. The conversion rule information extraction portion 19 extracts the conversion rule information corresponding to the evaluation objects concerned and the situation at the side of the user terminal 30 from the conversion rule information storage domain c3.

When conversion rule information is extracted by the conversion rule information extraction portion 19, the conversion portion 16 converts a distribution information structured document on the basis of the extracted conversion rule information. Moreover, when conversion rule information is not extracted by the conversion rule information extraction portion 19, the conversion portion 16 converts a distribution information structured document on the basis of the conversion rule information generated by the conversion rule information generation portion 12 in the same manners as in the first preferred embodiment.

In the next place, the operation of the present preferred embodiment is explained. In the first place, as for the outline operation of the structured document conversion processing to be performed in the structured document conversion device 10s in the present preferred embodiment, since it is same as the outline operation of the structured document conversion processing performed in the structured document conversion device 10 explained in the first preferred embodiment, the explanation thereof is omitted. However, among the outline operation of the structured document conversion processing, the operation of the conversion rule information generation processing (S2 in FIG. 9) differs from that in the first preferred embodiment, therefore, the explanations thereof are made hereinafter.

Figure 13:
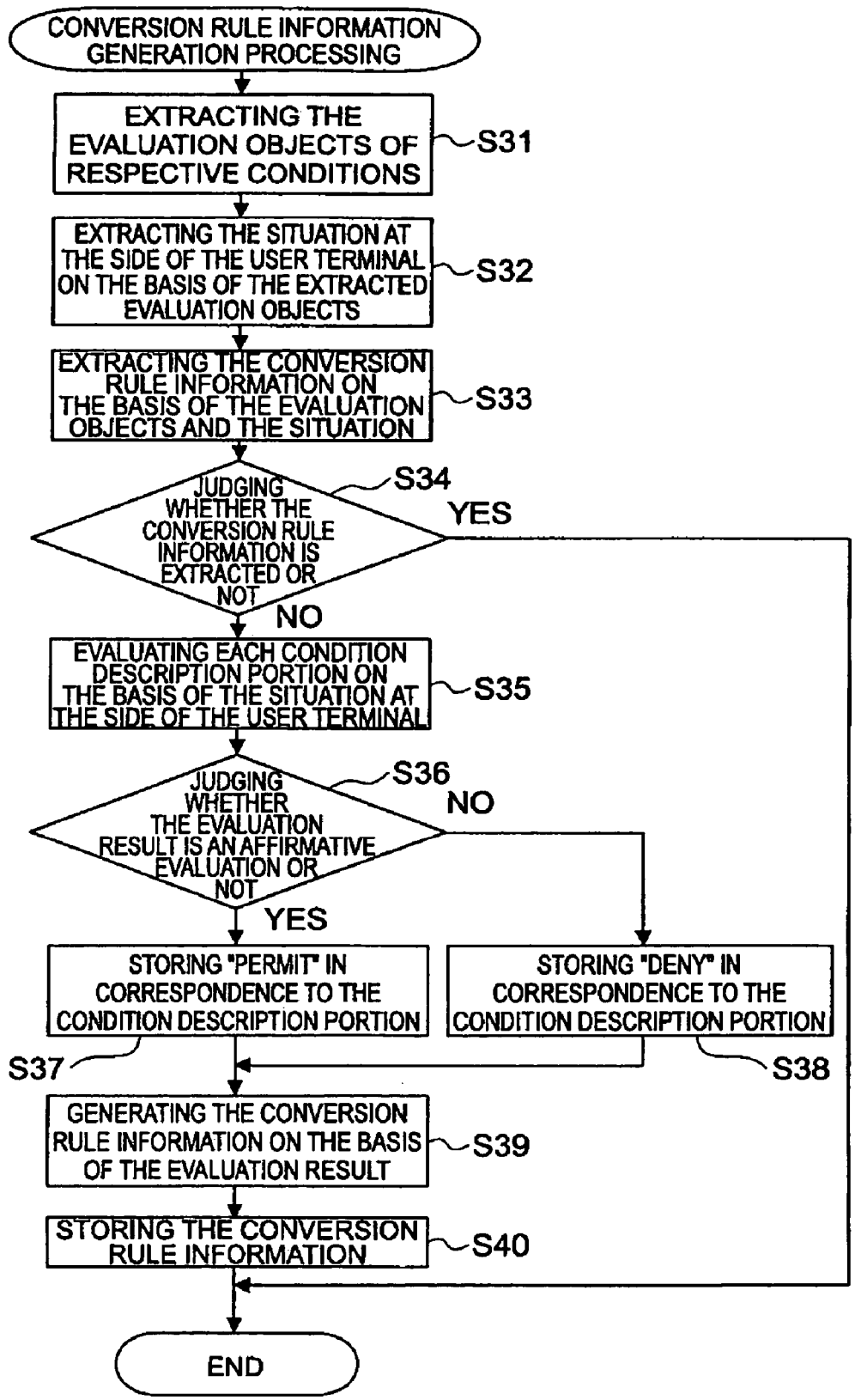
FIG. 13 is a flow chart showing a process of the conversion rule information generation in the second preferred embodiment.

In the next place, by reference to FIG. 13, the detailed operation of the conversion rule information generation processing is explained. Herein, since each processing of steps S31, S32, and S35~S39 shown in FIG. 13 is same as each processing of steps S11~S17 explained in full detail in the first preferred embodiment respectively (Refer to FIG. 10.), explanations thereof are omitted, and it explanations are made on each processing of steps S33, S34, and S40 different from the first preferred embodiment.

As shown in FIG. 13, in Step S33, on the basis of the evaluation objects extracted by the evaluation object extraction portion 13 and the situation at the side of the user terminal 30 extracted by the user situation extraction portion 14, the conversion rule information extraction portion 19 of the structured document conversion device 10s extracts the conversion rule information corresponding to the evaluation objects and the situation at the side of the user terminal 30 for from the conversion rule information stored in the conversion rule information storage domain c3 (Step S33).

Next, the conversion rule information extraction portion 19 of the structured document conversion device 10s judges whether the conversion rule information corresponding to the evaluation objects and the situation of the user terminal 30 could be extracted or not (Step S34). When this judgment is YES (Step S34; YES), the structured document conversion device 10s ends the conversion rule information generation processing. Consequently, the conversion portion 16 converts the distribution information structured document on the basis of the conversion rule information extracted in Step S33.

On the other hand, in the judgment in Step S34, when the conversion rule information corresponding to the evaluation objects and the situation of the user terminal 30 could not be extracted (Step S34; YES), the same processing as the steps S13~S17 in FIG. 10 explained in the first preferred embodiment is performed (Step S35~S39). And the conversion rule information memory portion 18 stores the conversion rule information generated by the conversion rule information generation portion 12 in Step S39, in correspondence to the evaluation objects extracted by the evaluation object extraction portion 13 and the situation of the user terminal 30 extracted by the user situation extraction portion 14 into the conversion rule information storage domain c3 (Step S40).

Accordingly, in the structured document conversion device 10s in the present preferred embodiment, since the conversion rule information generated by the conversion rule information generation portion 12 is stored in a memory device, the existing conversion rule information can be acquired and reused. Therefore, it becomes possible to perform structured document conversion processing at high speed.

Modified Embodiments

In addition, in each of the preferred embodiments mentioned above, by describing a user's age and the likes into user situation information, and by describing the information about the right to access according to a user's age and the likes into the distribution rule information, access control is performed according to user situation information. However, the present invention is not limited to such an access control, but further, for example, by describing communication traffic conditions of networks and servers at the side, and so froth into user situation information, and by describing the information about the network access rule according to communication traffic conditions and so forth into distribution rule information, network control may be performed according to user situation information.

Moreover, in the second preferred embodiment mentioned above, when conversion rule information is stored into a memory device and a distribution information structured document is converted in the next time and after that, this stored conversion rule information is reused. However, the present invention is not limited to such reuse, but for example, the conversion rule information and the distribution information structured document converted by this conversion rule information may be stored in correspondence to evaluation objects contained in the conversion rule information and the distribution information structured document before conversion. Thereby, when the conversion rule information extracted on the basis of the evaluation objects contained in the distribution information structured document before conversion and evaluation objects contained in the conversion rule information is same as the conversion rule information to be the object of processing, the distribution information structured document after the conversion stored in correspondence to the conversion rule information concerned may be output from an output portion as it is, as a consequence, it is possible to further improve the high speed.

Lastly, according to the preferred embodiments of the present invention, explanation is made on the structured document conversion program, and the recording medium that stores the structured document conversion program and that can be read by a computer (hereinafter simply, recording medium). Herein, a recording medium refers to a medium that can transmit described contents of a program to a reading device arranged in the hardware resources of a computer causing to change energy such as magnetism, light, electricity, and the likes with a form of signals corresponding to the change, according to the described contents of the program. As such a recording medium, there are, for example, a magnetic disk, an optical disc, CD-ROM, a memory built in a computer, and so forth.

Figure 14:
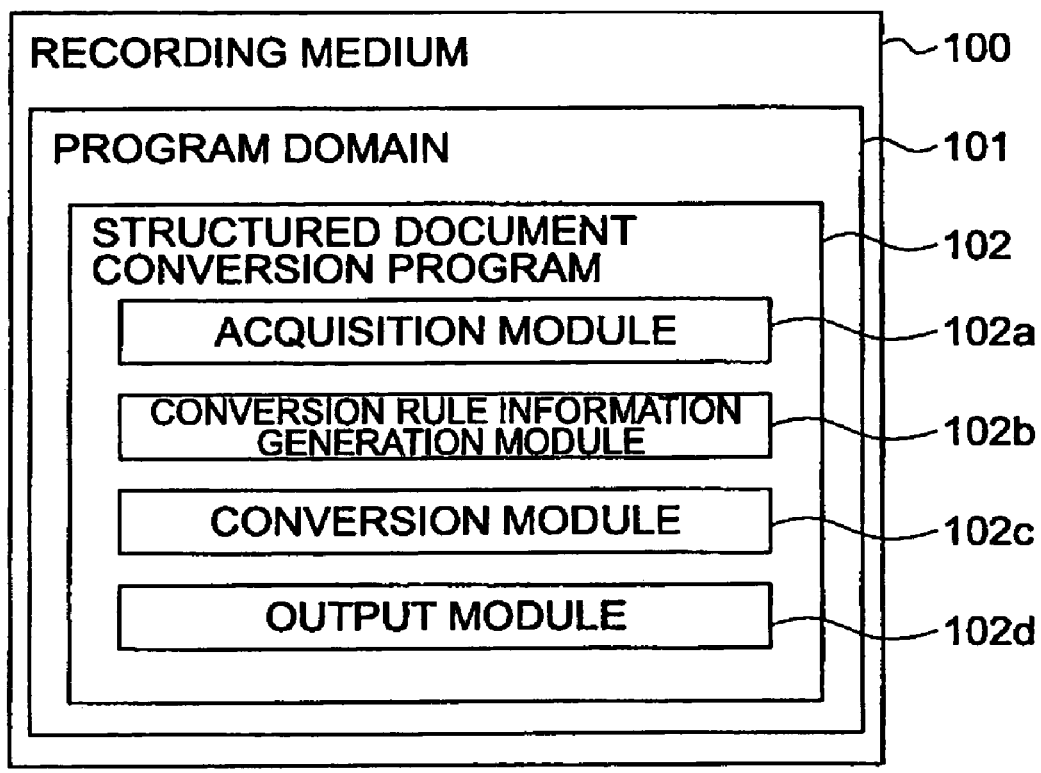
FIG. 14 is a schematic diagram of a recording medium wherein a program converting structured document is recorded.

FIG. 14 is a schematic diagram showing the configuration of the recording medium according to the preferred embodiments of the present invention. The recording medium 100 is equipped with a program domain 101 that records a program as shown in FIG. 14. A structured document conversion program 102 is recorded in this program domain 101. The structured document conversion program 102 comprises an acquisition module 102a, a conversion rule information generation module 102b, a conversion module 102c, and an output module 102d. The functions to be realized by the operating acquisition module 102a, the conversion rule information generation module 102b, the conversion module 102c, and the output module 102d respectively are same as the functions in each of the acquisition portion 11, the conversion rule information generation portion 12, the conversion portion 16, and the output portion 17 of the structured document conversion device 10.

As explained heretofore, according to a structured document conversion device, a structured document conversion method, and a structured document conversion program under the present invention, it is possible to convert structured documents according to the user situations.

What is claimed is:

1. An apparatus for converting a structured document having information regarding multimedia contents comprising:
   acquisition means for acquiring distribution rule information sent from a remote source when data contents are sent to said acquisition means, wherein distribution rules of the data contents are described and receiver side situation information wherein the situations at the side of receivers of the contents are described, said data contents includes multimedia contents;
   generation means for generating the conversion rule information wherein the conversion rules for converting structured documents in which information about the contents is described, said information including a media information describing portion, on the basis of the distribution rule information and the receiver side situation information acquired by the acquisition means; and
   conversion means for converting the structured documents, on the basis of the conversion rule information generated by the generation means without an intermediate conversion of the structured documents, wherein
   the generation means includes a first extraction means for extracting evaluation objects of the conditions included in the distribution rules from the distribution rule information.

2. The apparatus according to claim 1, the generation means comprises a second extraction means for extracting the receiver side situation corresponding to the evaluation object from the receiver side situation information on the basis of the evaluation objects extracted by said first extraction means, and evaluation means for evaluating the conditions on the basis of the receiver side situation extracted by the second extraction means, and on the basis of the results of the evaluation performed by the evaluation means, the conversion rule information is generated.

3. The apparatus according to claim 2, when the evaluation performed by the evaluation means is a negative evaluation, the generation means generates the conversion rule information including a conversion rule to delete objects corresponding to the conditions under which the evaluation has been performed from the structured document or change the objects concerned.

4. The apparatus according to claim 2, further comprising memory means for storing the conversion rule information generated by the generation means, in correspondence to the evaluation objects extracted by the first extraction means and the receiver side situation extracted by the second extraction means, wherein
   the generation means further comprising a third extraction means that, on the basis of the evaluation objects extracted by the first extraction means and the receiver side situation extracted by the second extraction means, extracts the conversion rule information corresponding to the evaluation objects and the receiver side situation from the conversion rule information stored by the memory means, and when the conversion rule information is not extracted by the third extraction means, the generation means generates the conversion rule information on the basis of the result of the evaluation performed by the evaluation means, and
   when the conversion rule information is extracted by the third extraction means, the conversion means converts a structured document, on the basis of the extracted conversion rule information.

5. The apparatus of claim 1, wherein information regarding the contents of the structured documents is described in each of said evaluation objects.

6. The apparatus of claim 1, wherein the conversion means judges from information of the structured documents described in each of said objects whether access control is performable to convert or select the accessible object on the basis of the conversion rule information generated by the generation means.

7. The apparatus of claim 1, further comprising access control means, for judging whether to grant access on either a keyword or value basis.

8. The apparatus of claim 1, wherein:
   information regarding the contents of the structured documents is described in each of said evaluation objects;
   the conversion means judges from information of the structured documents described in each of said objects whether access control is performable to convert or select the accessible object on the basis of the conversion rule information generated by the generation means; and
   further comprising access control means, for judging whether to grant access on either a keyword or value basis.

9. A computer-implemented method for converting a structured document having information regarding multimedia contents comprising steps of:
   acquiring distribution rule information sent from a remote source when data contents are sent to a distribution mechanism, wherein distribution rules of the data contents are described and receiver side situation information wherein the situations at the side of receivers of the contents are described, said data contents includes multimedia contents;

generating conversion rule information wherein the conversion rules for converting the structured document in which information about the contents is described, said information including a media information describing portion, on the basis of the distribution rule information and the receiver side situation information acquired in the acquiring step;

converting structured documents, on the basis of the conversion rule information generated in the generating step without an intermediate conversion of the structured documents, and storing the structured documents in a computer readable memory for subsequent retrieval, wherein the generation step includes extracting evaluation objects of conditions in the distribution rules from the distribution rule information.

10. The computer implemented method of claim 9, wherein information regarding the contents of the structured documents is described in each of said evaluation objects.

11. The computer implemented method of claim 9, wherein the converting step judges from information of the structured documents described in each of said objects whether access control is performable to convert or select the accessible object on the basis of the conversion rule information generated by the generation step.

12. The computer implemented method claim 9, further comprising controlling access on a judgment based on keyword or value.

13. The computer implemented method of claim 9, wherein:

information regarding the contents of the structured documents is described in each of said evaluation objects;

the converting step judges from information of the structured documents described in each of said objects whether access control is performable to convert or select the accessible object on the basis of the conversion rule information generated by the generation step;

further comprising judging whether to grant access on either a keyword or value basis.

14. A computer readable medium having computer program instructions encoded thereon that implement functions for converting a structured document having information regarding multimedia contents when the instructions are executed by a processor, the functions comprising:

acquisition means for acquiring distribution rule information sent from a remote source when data contents are sent to said acquisition means, wherein distribution rules of the data contents are described and receiver side situation information wherein the situations at the side of receivers of the contents are described, said data contents includes multimedia contents;

generation means for generating conversion rule information wherein the conversion rules for converting the structured document in which information about contents is described, said information including a media information describing portion, on the basis of the distribution rule information and the receiver side situation information acquired by the acquisition means; and conversion means for converting the structured documents, on the basis of the conversion rule information generated by the generation means without an intermediate conversion of the structured documents, wherein the generation means includes a first extraction means for extracting evaluation objects of the conditions included in the distribution rules from the distribution rule information.

15. The computer readable medium of claim 14, wherein information regarding the contents of the structured documents is described in each of said evaluation objects.

16. The computer readable medium of claim 14, wherein the conversion means judges from information of the structured documents described in each of said objects whether access control is performable to convert or select the accessible object on the basis of the conversion rule information generated by the generation means.

17. The computer readable medium of claim 14, further comprising access control means for judging whether to grant access on either a keyword or value basis.

18. The computer readable medium of claim 14, wherein:

information regarding the contents of the structured documents is described in each of said evaluation objects;

the conversion means judges from information of the structured documents described in each of said objects whether access control is performable to convert or select the accessible object on the basis of the conversion rule information generated by the generation means; and further comprising access control means for judging whether to grant access on either a keyword or value basis.

19. An apparatus for converting a structured document having information regarding multimedia contents comprising:

acquisition means for acquiring distribution rule information wherein distribution rules of contents are described and receiver side situation information wherein the situations at the side of receivers of the contents are described, said data contents includes multimedia contents;

generation means for generating the conversion rule information wherein the conversion rules for converting structured documents in which information about the contents is described, said information including a media information describing portion, on the basis of the distribution rule information and the receiver side situation information acquired by the acquisition means; and conversion means for converting the structured documents, on the basis of the conversion rule information generated by the generation means without an intermediate conversion of the structured documents, the generation means comprising:

a first extraction means for extracting evaluation objects of the conditions included in the distribution rules from the distribution rule information, a second extraction means for extracting the receiver side situation corresponding to the evaluation object from the receiver side situation information on the basis of the evaluation objects extracted by said first extraction means, and evaluation means for evaluating the conditions on the basis of the receiver side situation extracted by the second extraction means, and on the basis of the results of the evaluation performed by the evaluation means, the conversion rule information is generated.

20. The apparatus of claim 19, wherein information regarding the contents of the structured documents is described in each of said evaluation objects.

21. The apparatus of claim 19, wherein the conversion means judges from information of the structured documents described in each of said objects whether access control is performable to convert or select the accessible object on the basis of the conversion rule information generated by the generation means.

22. The apparatus of claim 19, further comprising access control means, for judging whether to grant access on either a keyword or value basis.

23. The apparatus of claim 19, wherein
information regarding the contents of the structured documents is described in each of said evaluation objects;
wherein the conversion means judges from information of the structured documents described in each of said objects whether access control is performable to convert or select the accessible object on the basis of the conversion rule information generated by the generation means;
further comprising access control means, for judging whether to grant access on either a keyword or value basis.

24. A method for converting a structured document having information regarding multimedia contents comprising steps of:
acquiring distribution rule information wherein distribution rules of contents are described and receiver side situation information wherein the situations at the side of receivers of the contents are described, said data contents includes multimedia contents;
generating conversion rule information wherein the conversion rules for converting the structured document in which information about the contents is described, said information including a media information describing portion, on the basis of the distribution rule information and the receiver side situation information acquired in the acquiring step, the generating step comprising the steps of:
first extracting evaluation objects of the conditions included in the distribution rules from the distribution rule information,
second extracting the receiver side situation corresponding to the evaluation object from the receiver side situation information on the basis of the evaluation objects extracted by said first extraction step, and
evaluating the conditions on the basis of the receiver side situation extracted by the second extraction step, and on the basis of the results of the evaluation performed by the evaluation step, the conversion rule information being generated;
converting structure documents, on the basis of the conversion rule information generated in the generating step without an intermediate conversion of the structured documents,
outputting the converted structured documents to a distribution server.

25. The method of claim 24, wherein information regarding the contents of the structured documents is described in each of said evaluation objects.

26. The method of claim 24, wherein the converting step judges from information of the structured documents described in each of said objects whether access control is performable to convert or select the accessible object on the basis of the conversion rule information generated by the generation step.

27. The method of claim 24, further comprising controlling access from a judgment based on keyword or value.

28. The method of claim 24, wherein:
information regarding the contents of the structured documents is described in each of said evaluation objects;
the converting step judges from information of the structured documents described in each of said objects whether access control is performable to convert or select the accessible object on the basis of the conversion rule information generated by the generation step;
further comprising judging whether to grant access on either a keyword or value basis.

29. A computer readable medium having computer program instructions encoded thereon that implement functions for converting a structured document having information regarding multimedia contents when the instructions are executed by a processor, the functions comprising:
acquisition means for acquiring distribution rule information wherein distribution rules of contents are described and receiver side situation information wherein the situations at the side of the receivers of the contents are described, said data contents includes multimedia contents;
generation means for generating the conversion rule information wherein the conversion rules for converting structured documents in which information about the contents is described, said information including a media information describing portion, on the basis of the distribution rule information and the receiver side situation information acquired by the acquisition means; and
conversion means for converting the structured documents, on the basis of the conversion rule information generated by the generation means without an intermediate conversion of the structured documents,
the generation means comprising:
a first extraction means for extracting evaluation objects of the conditions included in the distribution rules from the distribution rule information,
a second extraction means for extracting the receiver side situation corresponding to the evaluation object from the receiver side situation information on the basis of the evaluation objects extracted by said first extraction means, and
evaluation means for evaluating the conditions on the basis of the receiver side situation extracted by the second extraction means, and on the basis of the results of the evaluation performed by the evaluation means, the conversion rule information is generated.

30. The computer readable medium of claim 29, wherein information regarding the contents of the structured documents is described in each of said evaluation objects.

31. The computer readable medium of claim 29, wherein the conversion means judges from information of the structured documents described in each of said objects whether access control is performable to convert or select the accessible object on the basis of the conversion rule information generated by the generation means.

32. The computer readable medium of claim 29, further comprising means for whether to grant access on either a keyword or value basis.

33. The computer readable medium of claim 29, wherein:
information regarding the contents of the structured documents is described in each of said evaluation objects;
the conversion means judges from information of the structured documents described in each of said objects whether access control is performable to convert or select the accessible object on the basis of the conversion rule information generated by the generation means; and
further comprising means for judging whether to grant access on either a keyword or value basis.

* * * * *